Nov. 27, 1923.
L. HITCHCOCK
TIRE ARMOR
Filed March 21, 1921
1,475,302
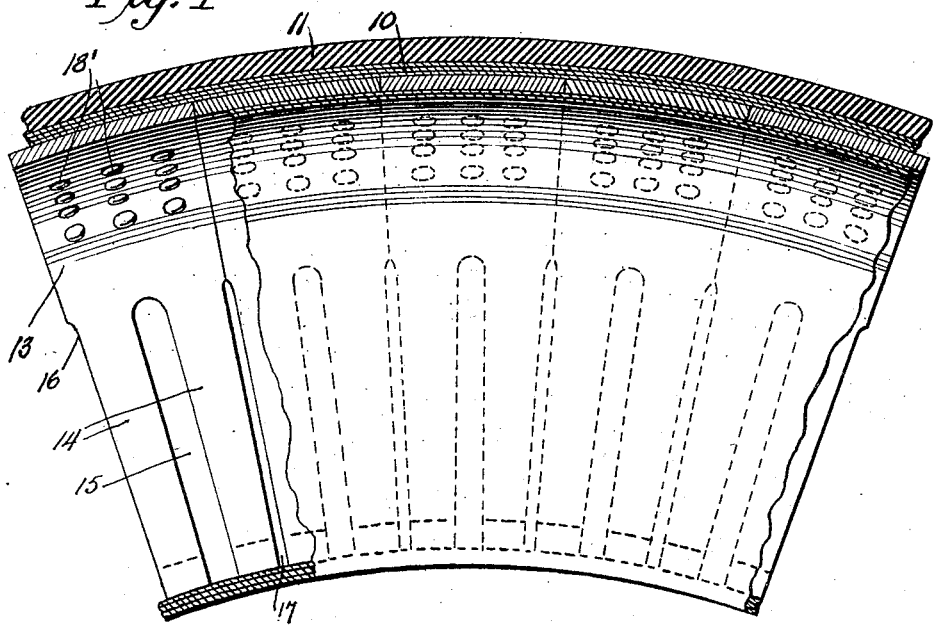
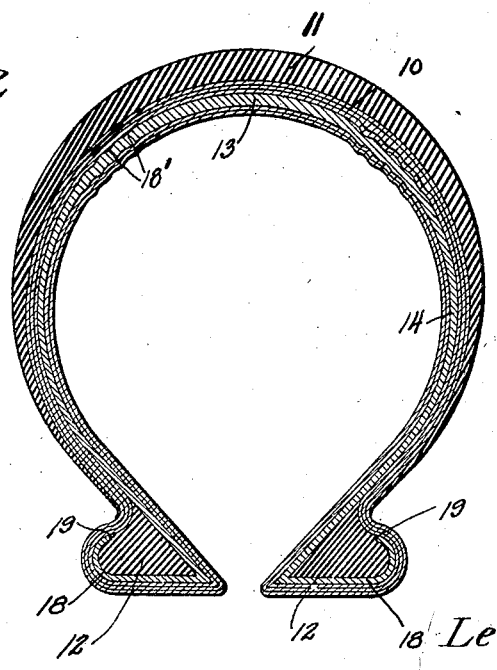
Inventor
Levi Hitchcock.
By J. Raney Kelly, Attorney Patented Nov. 27, 1923.

1,475,302

UNITED STATES PATENT OFFICE.

LEVI HITCHCOCK, OF MERIDALE, NEW YORK.

TIRE ARMOR.

Application filed March 21, 1921. Serial No. 453,914.

*To all whom it may concern:*

Be it known that I, LEVI HITCHCOCK, citizen of the United States, residing at Meridale, in the county of Delaware and State of New York, have invented certain new and useful Improvements in Tire Armor, of which the following is a specification.

This invention relates to improvements in tire armor and more particularly to internal armor or pneumatic tire shoes.

The main and principal object of the invention is to provide new and novel internal armor for tire shoes in the form of a series of independent metallic plates so formed and positioned to eliminate the danger of punctures and blowouts and at the same time not detract from the normal resiliency of the tire.

A further object of my invention is to provide a device of the above character which is simple in construction, cheap to manufacture, easily associated with the tire shoe and built up therein, and which it is believed will not increase the cost of the tire shoe.

Various other objects and advantages of my invention will become apparent during the continuance of the following description.

In the drawings:—

Figure 1 is a fragmentary view in longitudinal cross section of a tire shoe and my invention associated therewith.

Figure 2 is a view in transverse cross section of the tire shoe and my invention as applied thereto.

In the present embodiment, I have shown a tire shoe consisting of a series of built up layers of rubberized farbric upon which is an outer rubber layer 11 and which is provided at its inner peripheral edges with the usual semi-rigid bead 12. However, it is to be understood that the type of tire shown in the drawing is selected merely for purposes of illustration and that my invention can be used in connection with other forms of tires if it is so desired.

Inasmuch as the device of my invention consists of a series of independent plates and that each plate is substantially the same, only one will be described in detail.

The body portion 13 of the plate is of a substantially thick metal and the sides thereof taper slightly from a central point towards the outer edges thereof. The plate is of sufficient width to extend across the entire actual tread surface of the shoe and terminate in spaced legs or extensions 14 as clearly shown in Figure 1. The extensions or legs being spaced apart as shown provide a slot or opening 15 therebetween and inasmuch as the outer edge of each leg is cut away as at 16, another opening or slot 17 will be formed between the legs of each independent member. By reason of this construction, the plates are given more resiliency along the sides of the tire shoe and in addition, a great saving of material results.

At their outer ends, the legs 14 terminate in suitably curved extensions 18 that fit around the semi-rigid bead 12 of the tire whereby the plates will be firmly held in position. By cutting away the bead as shown at 19, the extensions 18 will lie flush with the outer surface of the bead so that the fabric of the tire will lie flat thereon.

I also deem it expedient to provide the plates 13 with spaced depressions 18′ which in addition to providing means to insure a better connection between the plate and fabric and rubber layers of the tire, serves to prevent nails and other instruments which might enter the tire shoe from tearing the rubber and fabric away from the plate.

In actual practice the plates may be secured between any two of the layers of the tire shoe and are preferably arranged so as to lie immediately adjacent each other shown as in Figure 1.

When they are in place, the plates eliminate the danger of punctures and blowouts and at the same time do not detract from the resiliency of the tire due to the special formation of the legs 14. Moreover it will be observed that providing the legs or extensions 18 that fit snugly about the bead 12, the plates will be firmly held in place and independent movement thereof will be prevented.

From the above, it is believed that the advantages and novel features of my invention will be readily understood and therefore further detailed description of my invention is deemed unnecessary.

What is claimed is:—

The combination with a tire shoe, of a series of independent armor plates arched to conform to the configuration thereof and arranged therein in engaging relation with each other to produce a continuous armor throughout the tread surface of the shoe, spaced legs formed at the ends of said plates, said legs being also spaced inwardly of the edges of said plate and said legs terminating in the bead of said shoe, substantially as described.

In testimony whereof I affix my signature.

LEVI HITCHCOCK.